(12) United States Patent
Reinschmidt

(10) Patent No.: US 7,068,077 B1
(45) Date of Patent: Jun. 27, 2006

(54) LVDS OUTPUT DRIVER HAVING LOW SUPPLY VOLTAGE CAPABILITY

(75) Inventor: Robert M. Reinschmidt, Hollis, NH (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 10/815,057

(22) Filed: Mar. 30, 2004

Related U.S. Application Data

(60) Provisional application No. 60/463,827, filed on Apr. 17, 2003.

(51) Int. Cl.
*H03K 19/175* (2006.01)

(52) U.S. Cl. .................... 326/83; 326/87; 326/115; 326/121; 327/108; 327/391; 330/253

(58) Field of Classification Search ............. 326/32, 326/87, 115, 121, 122; 327/534, 535, 537, 327/170, 172, 381, 391; 330/253, 261, 252
See application file for complete search history.

(56) References Cited

U.S. PATENT DOCUMENTS

| | | | |
|---|---|---|---|
| 5,739,721 A * | 4/1998 | Brehmer ............... | 330/253 |
| 5,760,647 A * | 6/1998 | Miller et al. .......... | 330/252 |
| 5,959,472 A | 9/1999 | Nagamatsu et al. | |
| 6,111,431 A | 8/2000 | Estrada | |
| 6,181,170 B1 | 1/2001 | Koifman | |
| 6,337,586 B1 | 1/2002 | Aizawa | |
| 6,362,644 B1 | 3/2002 | Jeffery | |
| 6,366,167 B1 * | 4/2002 | Stockstad ............... | 330/253 |
| 6,369,621 B1 | 4/2002 | Tinsley et al. | |
| 6,407,582 B1 | 6/2002 | Chan | |
| 6,552,582 B1 * | 4/2003 | Bryan et al. ........... | 327/108 |
| 6,600,346 B1 | 7/2003 | Macaluso | |
| 6,617,888 B1 | 9/2003 | Volk | |
| 6,639,434 B1 | 10/2003 | Rahman | |
| 6,720,805 B1 | 4/2004 | Haas | |
| 6,791,377 B1 | 9/2004 | Ilchmann et al. | |
| 6,847,232 B1 | 1/2005 | Tinsley et al. | |
| 6,900,663 B1 | 5/2005 | Roper et al. | |
| 2003/0085736 A1 * | 5/2003 | Tinsley et al. ......... | 326/81 |

\* cited by examiner

*Primary Examiner*—Vibol Tan
(74) *Attorney, Agent, or Firm*—Blakely, Sokoloff, Taylor & Zafman LLP

(57) ABSTRACT

A LVDS output driver has been disclosed. One embodiment of the LVDS output driver includes a number of source followers, each of the source followers including a pull-down transistor having a source, a drain, a gate, and a bulk terminal. The embodiment of the LVDS output driver further includes a number of pull-up transistors, each of the pull-up transistors having a source, a drain, and a gate, wherein the drain of each of the pull-up transistors is coupled to the source of a pull-down transistor of the source followers, to output a number of differential signals via the drains of the pull-up transistors. Other embodiments are described and claimed.

13 Claims, 5 Drawing Sheets

… … …

LVDS OUTPUT DRIVER HAVING LOW SUPPLY VOLTAGE CAPABILITY

REFERENCE TO RELATED APPLICATION

This application claims the benefit of U.S. Provisional Application No. 60/463,827, filed on Apr. 17, 2003.

FIELD OF INVENTION

The present invention relates generally to integrated circuit output drivers, and more particularly, to low voltage differential signal (LVDS) output drivers.

BACKGROUND

Low-Voltage Differential Signaling (LVDS) is an interface standard that can be used for high-speed data transmission. By using low swing signals (typically about 300 mV), fast bit rates, lower power, and better noise performance can be achieved. The differential nature allows for increased noise immunity and noise margins. Examples of applications that use LVDS signaling include hubs for data communications, base stations and switches for telecommunications, flat-panel displays and servers, peripheral devices including printers and digital copy machines, and high-resolution displays for industrial applications.

Most integrated circuit (IC) or "chip" driver circuits designed to implement an LVDS interface include circuits that use a 2.5V or higher power supply. A typical conventional driver circuit design is shown in FIG. 1. The circuit includes two operational amplifiers (amp1 and amp2) to generate internal vdd_voh and vss_vol power supplies, respectively. The p-type metal oxide semiconductor (PMOS) (i.e., p-channel) and n-type metal oxide semiconductor (NMOS) (i.e., n-channel) transistors referenced to these supplies can be designed to produce the desired signal swing and common mode voltage. These switching transistors connected to vdd_voh and vss_vol require full rail (about 2.5V in this example) complementary metal oxide semiconductor (CMOS) signal levels at their gates to fully switch the output transistors (e.g., Q5, Q6, Q7 and Q8). The skew between input true and complement signals are very low to achieve the signal integrity specified in the LVDS standard. For clarity, the low voltage to high voltage level translators as well as additional conventional circuitry to minimize the skew are not shown in FIG. 1.

Disadvantages of the above approach include a lack of functionality at lower power supplies, such as about 1.8V or lower, using transistors with a 2.5V compatible process. According to one LVDS standard, the nominal output common mode voltage is about 1.25 volts. This further requires a sufficient drive on the NMOS output transistors (Q6 and Q8) to accommodate the Vol (maximum output voltage for "low" signal detection) specification. In the above design, the NMOS output transistors (Q6 and Q8), for example, will not sufficiently turn on at such low voltage to provide the appropriate output levels and signal integrity over process/voltage/temperature (PVT) corners with a power supply at or below approximately 1.8V.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
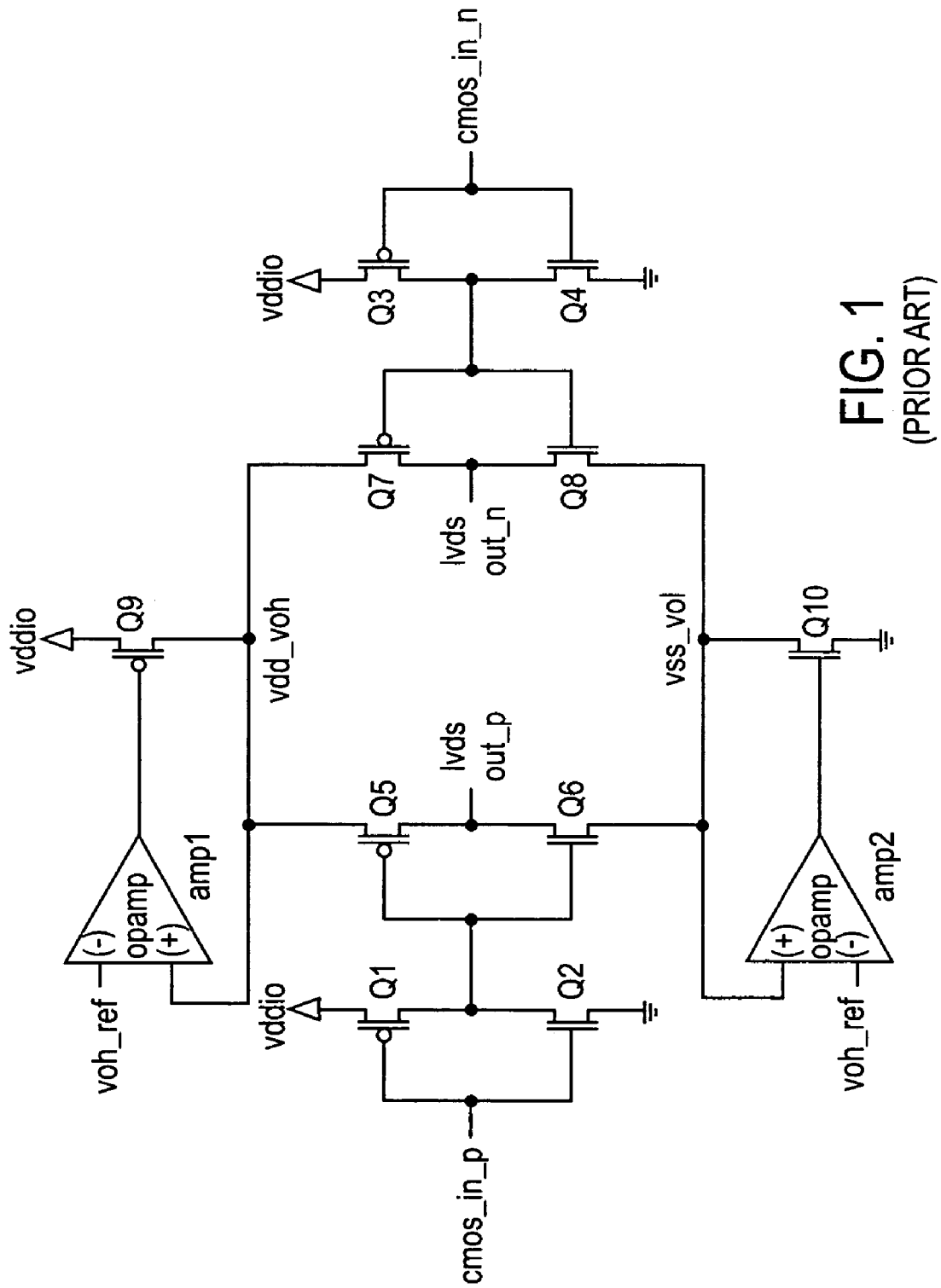
FIG. 1 shows an existing LVDS output driver.
Figure 2:
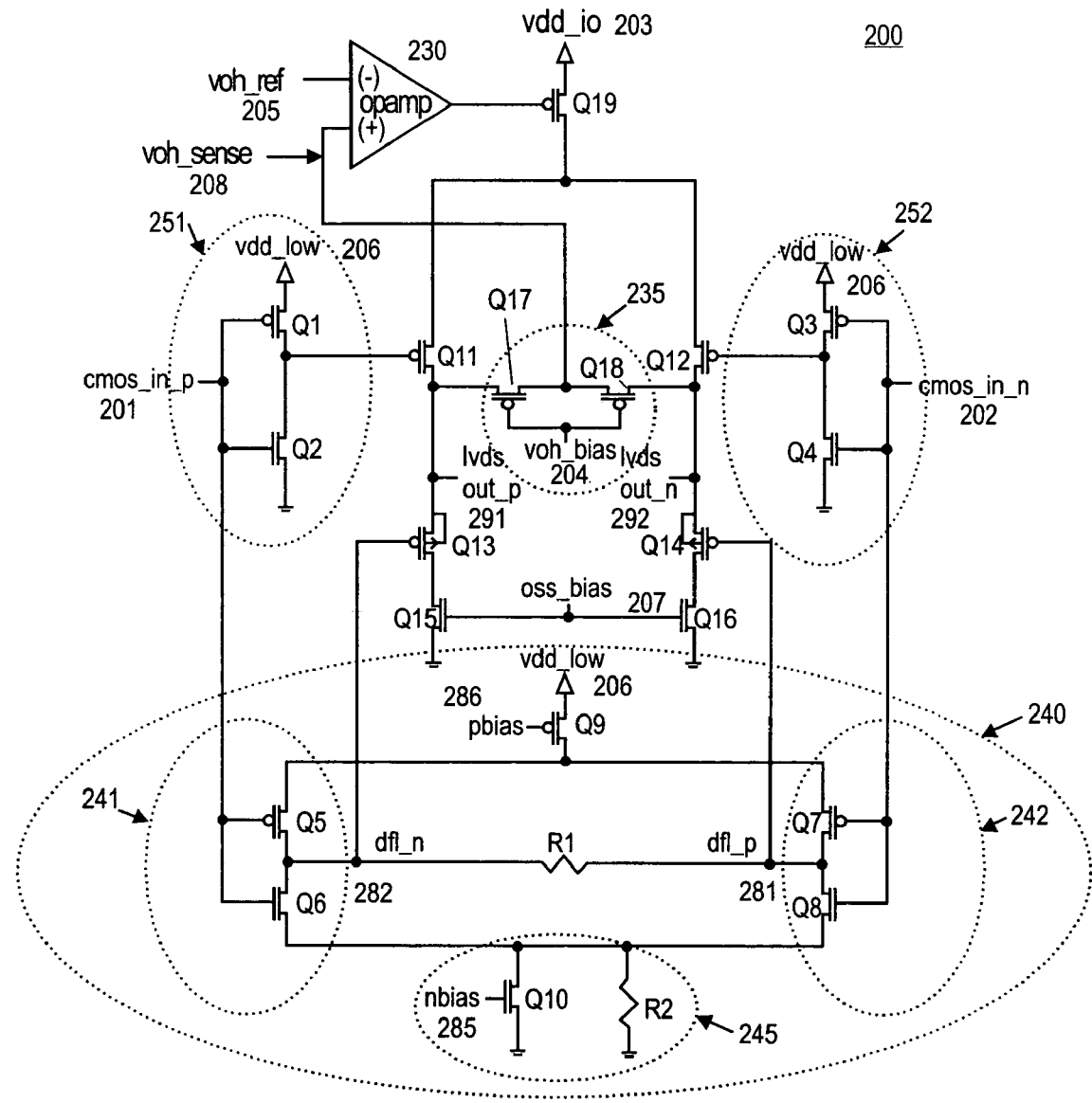
FIG. 2 shows one embodiment of a LVDS output driver having low supply voltage capability.

FIG. 2 shows one embodiment of a LVDS output driver having low supply voltage capability in an electronic device. The LVDS output driver 200 includes a pair of pull-up transistors Q11 and Q12, a pair of pull-down transistors Q13 and Q14, a pair of NMOS transistors Q15 and Q16, a first pair of inverters 251 and 252, a first current source Q19, a pair of PMOS transistors Q17 and Q18, an operational amplifier 230, a second current source Q9, a second pair of inverters 241 and 242, a current sink 245, and a load R1.

In one embodiment, each of the pull-down transistors Q13 and Q14 are each configured as a source follower. Each of the pull-down transistors Q13 and Q14 includes a source, a drain, a gate, and a bulk terminal. In one embodiment, the pull-down transistors Q13 and Q14 are PMOS transistors. The source of each of the pull-down transistors Q13 and Q14 may be coupled to the bulk terminal of the corresponding pull-down transistor to reduce the body effect on the corresponding pull-down transistor.

Two differential input signals, cmos_in_p 201 and cmos_in_n 202, are input to the LVDS output driver 200. The differential input signals may come from the core logic (not shown) of the electronic device. In one embodiment, the inverters 251 and 252 amplify the differential input signals 201 and 202, respectively. Then the inverters 251 and 252 may output the amplified input signals to the pull-up transistors Q11 and Q12. The inverters 251 and 252 may be powered by the voltage vdd_low 206. In some embodiments, vdd_low 206 is approximately between 1.1V and 1.3V. In one embodiment, the pull-up transistors Q11 and Q12 are PMOS transistors, each having a gate, a source, and a drain. The amplified input signals may be applied to the gates of the PMOS transistors Q11 and Q12. Furthermore, the drains of the PMOS transistors Q11 and Q12 may each be coupled to the sources of the pull-down transistors Q13 and Q14, respectively, to output the low voltage differential signals, lvds_out_p and lvds_out_n, respectively. In one embodiment, the PMOS transistors Q13 and Q14 are, respectively, biased by the NMOS transistors Q15 and Q16, which are coupled to each other at the gates of the NMOS transistors Q15 and Q16. A biasing voltage, oss_bias 207 may be applied to the gates of the NMOS transistors Q15 and Q16.

Unlike the existing design, the pull-down transistors Q13 and Q14 are driven by a pair of low swing differential signals. In one embodiment, the low swing differential signals are generated by a low swing differential pre-driver 240. The low swing differential pre-driver 240 may include the inverters 241 and 242, the load R1, the current source Q9, and the current sink 245. The inverters 241 and 242 may amplify the input differential signals 201 and 202, respectively, and output each of the amplified signals to each one of the nodes 281 and 282 of the load R1. The load R1 may include a resistor. The current source Q9 supplies a current to the load R1, which drains the current via the current sink 245. The current source Q9 may include a PMOS transistor powered by vdd_low 206. In some embodiments, vdd_low 206 is approximately between 1.1V and 1.3V. The current sink 245 may include an NMOS transistor Q10 and a resistor R2 coupled to each other in parallel. The NMOS transistor Q11 may be driven by a biasing voltage, nbias 285. The PMOS transistor Q9 may be driven by a biasing voltage, pbias 286. The low swing differential pre-driver 240 outputs the low swing differential signals dfl_p and dfl_n at the nodes 281 and 282, respectively. The low swing differential signals dfl_p and dfl_n may be applied onto the gates of the pull-down transistors Q14 and Q13, respectively, to drive the pull-down transistors.

In one embodiment, the sources of the pull-up transistors Q11 and Q12 are coupled to the current source Q19. The current source Q19 may include a PMOS transistor powered by vdd_io 203. In one embodiment, the range of vdd_io 203 is about 1.624 volts to 2.725 volts. The gate of the PMOS transistor of the current source Q19 may be coupled to an output of the operational amplifier 230, which drives the current source Q19 in response to an input signal to the operational amplifier 230, voh_ref 205 and voh_sense 208.

Furthermore, the drain of the PMOS transistor of the current source Q19 may be coupled to a sensing circuit 235. The sensing circuit senses the higher output voltage among the output voltages, lvds out_p 291 and lvds out_n 292, to generate the feedback signal, voh_sense 208. The sensing circuit 235 provides the feedback signal to the operational amplifier 230. In one embodiment, the sensing circuit 235 includes the PMOS transistors Q17 and Q18, biased by the voltage, voh_bias 204. Thus, a feedback path is provided in between the current source Q19, output voltages lvds out_p 291 and lvds out_n 292, and the operational amplifier 230. When lvds out_p 291 is higher than lvds out_n 292, more current flows through the PMOS transistor Q17 than the PMOS transistor Q18. Thus, in this case, the output voltage, voh_sense 208, of the sensing circuit 235 corresponds to lvds out_p 291. Likewise, when lvds out_n 292 is higher than lvds out_p 291, more current flows through the PMOS transistor Q18 than the PMOS transistor Q17. Thus, voh_sense 208 corresponds to lvds_n 292 in this case. The operational amplifier 230 may drive the current source Q19 in response to both voh_ref 205 and voh_sense 208 from the sensing circuit 235.

One should appreciate that the embodiment of the LVDS output driver described above is for illustration, not limitation. Additional circuit components or electronic devices not shown in FIG. 2 may be included in some embodiments of the LVDS output driver without departing from the spirit and scope of the appending claims.

Figure 3:
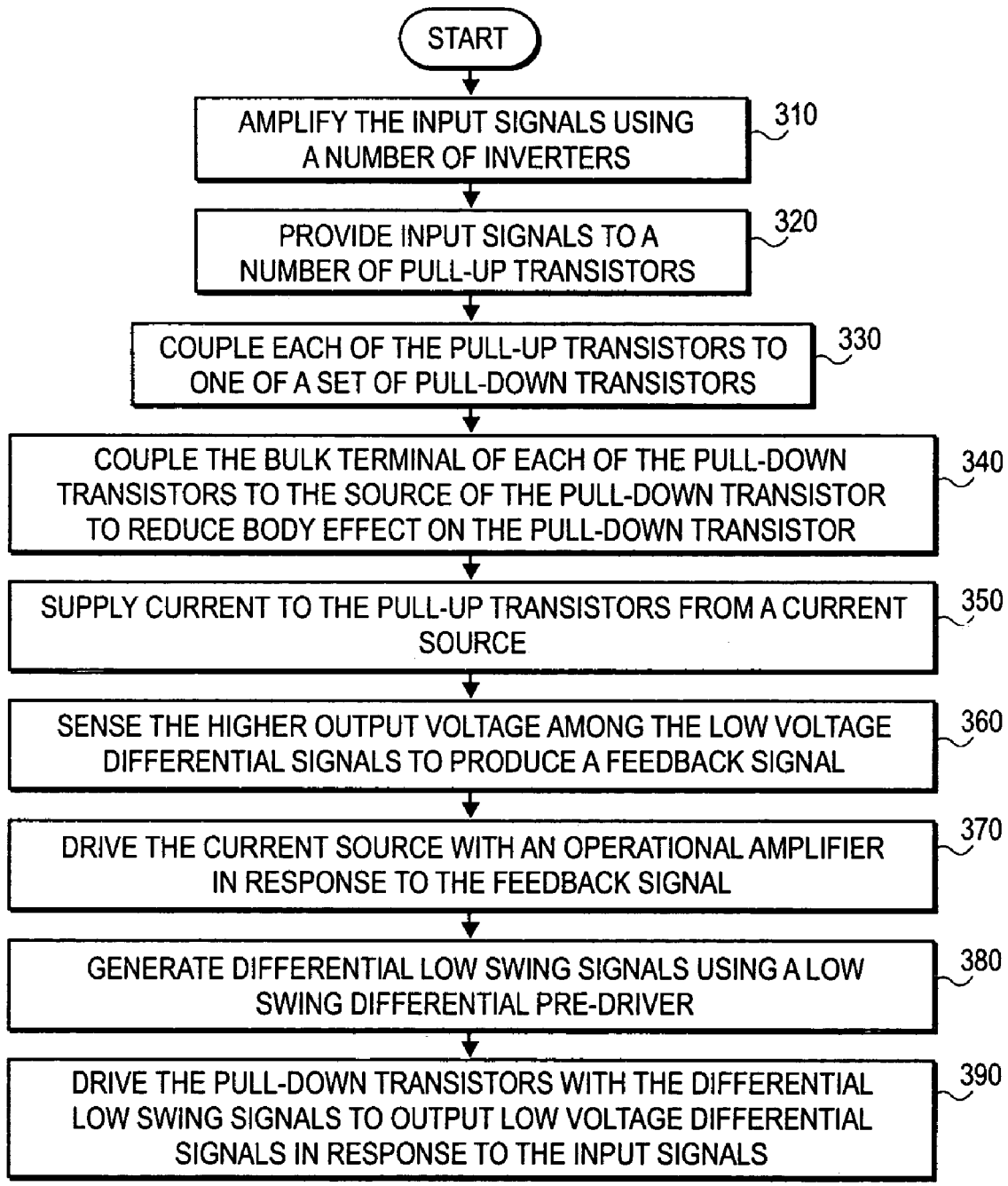
FIG. 3 shows one embodiment of a process to output low voltage differential signals.

FIG. 3 shows one embodiment of a process to output low voltage differential signals. At block 310, a number of input signals are amplified using inverters. At block 320, the amplified input signals are provided to a number of pull-up transistors from the inverters. At block 330, each of the pull-up transistors is coupled to one of a set of pull-down transistors. Each of the pull-down transistors may include a source, a drain, a gate, and a bulk terminal. A pull-up transistor may be coupled to the source of one of the pull-down transistors. At block 340, the bulk terminal of each of the pull-down transistors is coupled to the source of the corresponding pull-down transistor to reduce body effect on the corresponding pull-down transistor.

At block 350, a current is supplied to the pull-up transistors from a current source. At block 360, the higher output voltage among the low voltage differential signals is sensed to produce a feedback signal. At block 370, the current source is driven using an operational amplifier in response to the feedback signal.

At block 380, differential low swing signals are generated using a low swing differential pre-driver. The pull-down transistors are driven with the differential low swing signals in response to the input signals at block 390 to produce low voltage differential signals at the sources of the pull-down transistors.

Figure 4:
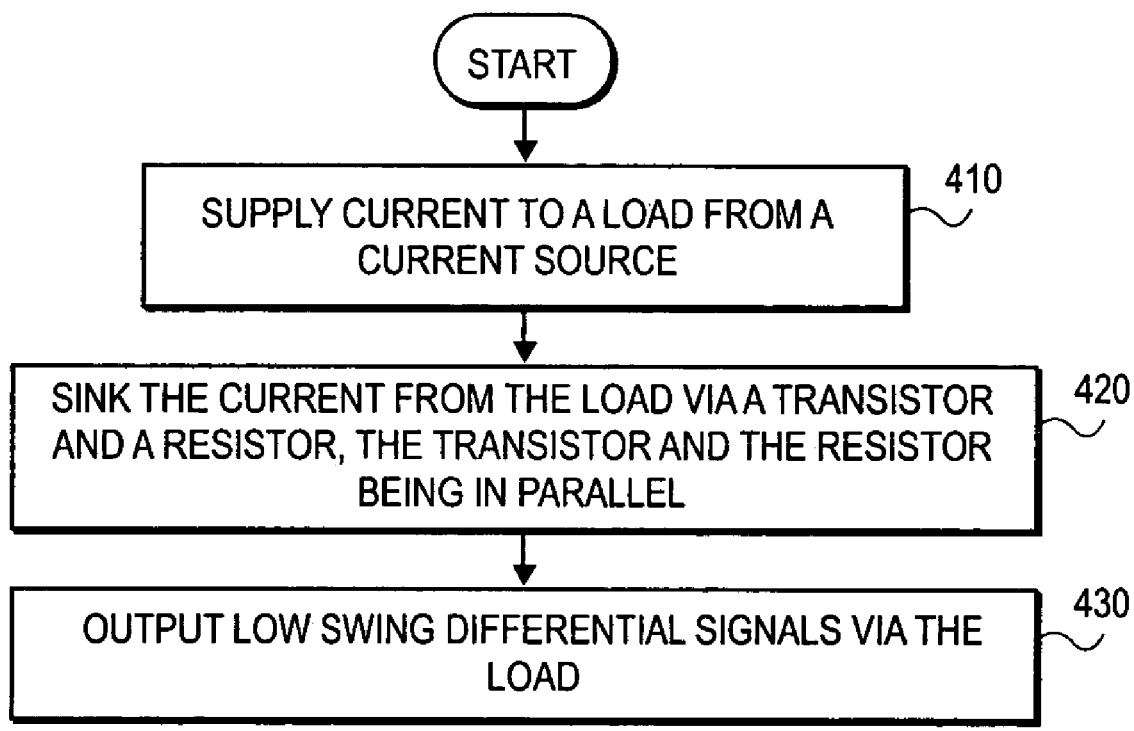
FIG. 4 shows one embodiment of a process to generate differential low swing signals using a low swing differential pre-driver.

FIG. 4 shows one embodiment of a process to generate differential low swing signals using a low swing differential pre-driver. At block 410, a current is supplied to a load in a low swing differential pre-driver from a current source. The load may include a resistor having two nodes. At block 420, the current from the load is sunk from the load via a transistor and a resistor. The transistor and the resistor may be coupled to each other in parallel. At block 430, a pair of low swing differential signals are output via the load. In one embodiment, the low swing differential signals are applied to the gates of the pull-down transistors in a LVDS driver to drive the pull-down transistors.

Figure 5:
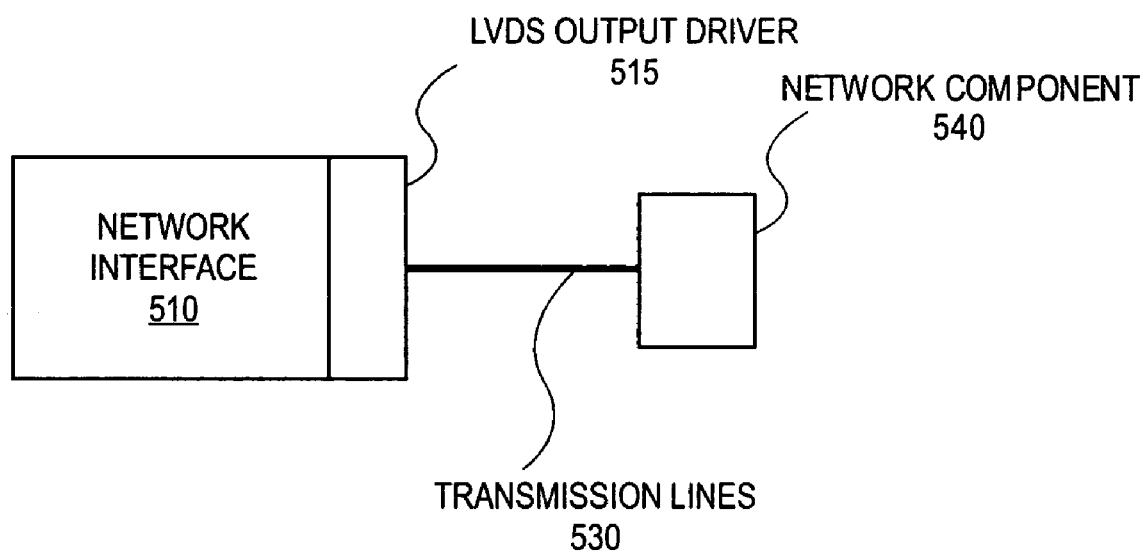
FIG. 5 shows an exemplary embodiment of a networked system.

FIG. 5 illustrates an exemplary embodiment of a networked system 500. The system 500 includes a network interface 510 having a LVDS output driver 515, transmission lines 530, and a network component 540. One example of the network component 540 is a storage device, such as a hard drive, a disk, etc. In one embodiment, the network interface 510 is an Ethernet interface. The network interface 510 is coupled via the LVDS output driver 515 and the transmission lines 530 to the network component 540. Signals may be transmitted between the network interface 510 and the network component 540 via the transmission lines 530. To send signals from the network interface 510 to the network component 540, the network interface 510 uses the LVDS output driver 515 to drive the signals onto the transmission lines 530. Exemplary embodiments of the LVDS output driver 515 have been discussed above with reference to FIG. 2.

Note that any or all of the components of the networked system 500 and associated hardware may be used in various embodiments of the present invention. However, it can be appreciated that other configurations of the networked system may include some or all of the components illustrated in FIG. 5. Furthermore, other embodiments of the networked system may include additional components not illustrated in FIG. 5.

The foregoing discussion merely describes some exemplary embodiments of the present invention. One skilled in the art will readily recognize from such discussion, the accompanying drawings, and the claims that various modifications can be made without departing from the spirit and scope of the appended claims. The description is thus to be regarded as illustrative instead of limiting.

What is claimed is:

1. An apparatus, comprising: a plurality of source followers, each of the plurality of source followers comprising a pull-down transistor having a source, a drain, a gate, and a bulk terminal;
a plurality of pull-up transistors, each of the plurality of pull-up transistors having a source, a drain, and a gate, wherein the drain of each of the plurality of pull-up transistors is coupled to the source of a pull-down transistor of the plurality of source followers, to output a plurality of differential signals via the drains of the plurality of pull-up transistors;
a first current source coupled to the sources of the plurality of pull-up transistors, wherein the first current source is powered by a first voltage of at least about 1.624V to 2.725V;
an operational amplifier, coupled to the first current source, to drive the first current source; and
a feedback path coupled between the drains of the plurality of pull-up transistors and an input of the operational amplifier.

2. An apparatus, comprising:
a plurality of source followers, each of the plurality of source followers comprising a pull-down transistor having a source, a drain, a gate, and a bulk terminal;
a plurality of pull-up transistors, each of the plurality of pull-up transistors m having a source, a drain, and a gate, wherein the drain of each of the plurality of the pull-up transistors is coupled to the source of a pull-down transistor of the plurality of source followers, to output a plurality of differential signals via the drains of the plurality of pull-up transistors; a first current source coupled to the sources of the plurality of pull-up transistors; an operational amplifier, coupled to the first current source, to drive the first current source; and
a feedback path coupled between the drains of the plurality of pull-up;
transistors and an input of the operational amplifier, wherein the feedback path further comprises a sensing circuit, the sensing circuit includes a plurality of transistors biased by a predetermined voltage.

3. The apparatus of claim 2, wherein the first current source is powered by a first voltage of at least about 1.624V to 2.725V.

4. An apparatus, comprising:
a plurality of source followers, each of the plurality of source followers comprising a pull-down transistor having a source, a drain, a gate, and a bulk terminal;
a plurality of pull-up transistors, each of the plurality of pull-up transistors CD having a source, a drain, and a gate, wherein the drain of each of the plurality of pull-up transistors is coupled to the source of a pull-down transistor of the plurality of source followers, to output a plurality of differential signals via the drains of the plurality of pull-up transistors;
a low swing differential pre-driver, coupled to the gates of the pull-down m transistors of the plurality of source followers, to drive the pull-down transistors; and
a plurality of inverters, each of the plurality of inverters being coupled to the gate of each of the plurality of pull-up transistors to amplify an input signal and to apply the amplified signal to the gate of the corresponding pull-up transistor, wherein the plurality of inverters are powered by a second voltage approximately between 1.1V and 1.3V.

5. The apparatus of claim 4,
a plurality of source followers, each of the plurality of source followers comprising a pull-down transistor having a source, a drain, a gate, and a bulk terminal;
a plurality of pull-up transistors, each of the plurality of pull-up transistors having a source, a drain, and a gate, wherein the drain of each of the plurality of pull-up transistors is coupled to the source of a pull-down transistor of the plurality of source followers, to output a plurality of differential signals via the drains of the plurality of pull-up transistors; and a low swing differential pre-driver, coupled to the gates of the pull-down transistors of the plurality of source followers, to drive the pull-down transistors,
wherein the low swing differential pre-driver comprises:
a second current source;
a current sink including a transistor and a resistor, the transistor being coupled to the resistor in parallel; and
a load, coupled between the second current source and the current sink, to output a plurality of low swing differential signals, wherein each of the plurality of low swing differential signals drives the gate of the pull-down transistor of one of the plurality of source followers.

6. The apparatus of claim 5, further comprising a plurality of inverters, each of the plurality of inverters being coupled to the gate of each of the plurality of pull-up transistors to amplify an input signal and to apply the amplified signal to the gate of the corresponding pull-up transistor, wherein the plurality of inverters are powered by a second voltage approximately between 1.1V and 1.3V.

7. The apparatus of claim 4, further comprising:
a network interface including the plurality of pull-up transistors and the plurality of source followers; and a plurality of transmission lines coupled to the network interface, the plurality of transmission lines being driven by the plurality of low voltage differential signals.

8. The apparatus of claim 7, further comprising a network component coupled to the network interface via the plurality of transmission lines, wherein the network component includes a storage device.

9. A method comprising:
providing a plurality of input signals to a plurality of pull-up transistors;
coupling each of the plurality of pull-up transistors to one of a plurality of pull-down transistors;
driving the plurality of pull-down transistors with a plurality of differential low swing signals to output a plurality of low voltage differential signals in response to the plurality of input signals; and
generating the plurality of differential low swing signals using a low swing differential pre-driver, wherein generating the plurality of differential low swing signals using the low swing differential pre-driver comprises:
supplying current to a load from a second current source;
sinking the current from the load via a transistor and a resistor, the transistor being coupled to the resistor in parallel; and
outputting a plurality of low swing differential signals via the load to the gates of the plurality of pull-down transistors.

10. The method of claim 9, further comprising reducing body effect on the plurality of pull-down transistors.

11. The method of claim 9, further comprising; supplying current to the plurality of pull-up transistors from a first current source;
  sensing one of the plurality of low voltage differential signals to produce a feedback signal; and
  driving the first current source with an operational amplifier in response to the feedback signal.

12. A method, comprising
  providing a plurality of input signals to a plurality of pull-up transistors,
  coupling each of the plurality of pull-up transistors to one of a plurality of pull-down transistors;
  driving the plurality of pull-down transistors with a plurality of differential low swing signals to output a plurality of low voltage differential signals in response to the plurality of input signals;
  amplifying the plurality of input voltages using a plurality of inverters, each of the plurality of inverters being coupled to a distinct one of the plurality of pull-up transistors; and
  powering the plurality of inverters by a voltage approximately between 1.1V and 1.3V.

13. An apparatus comprising:
  means for providing a plurality of input signals to a plurality of pull-up transistors;
  means for coupling each of the plurality of pull-up transistors to one of a plurality of pull-down transistors;
  means for driving the plurality of pull-down transistors with a plurality of differential low swing signals to output a plurality of low voltage differential signals in response to the plurality of input signals;
  means for generating the plurality of differential low swing signals using a low swing differential pre-driver, wherein the means for generating the plurality of differential low swing signals using the low swing differential pre-driver comprises:
  means for supplying current to a load from a second current source;
  means for sinking the current from the load via a transistor and a resistor, the transistor being coupled to the resistor in parallel; and In
  means for outputting a plurality of low swing differential signals via H the load to the gates of the plurality of pull-down transistors.

* * * * *